United States Patent Office 3,474,488
Patented Oct. 28, 1969

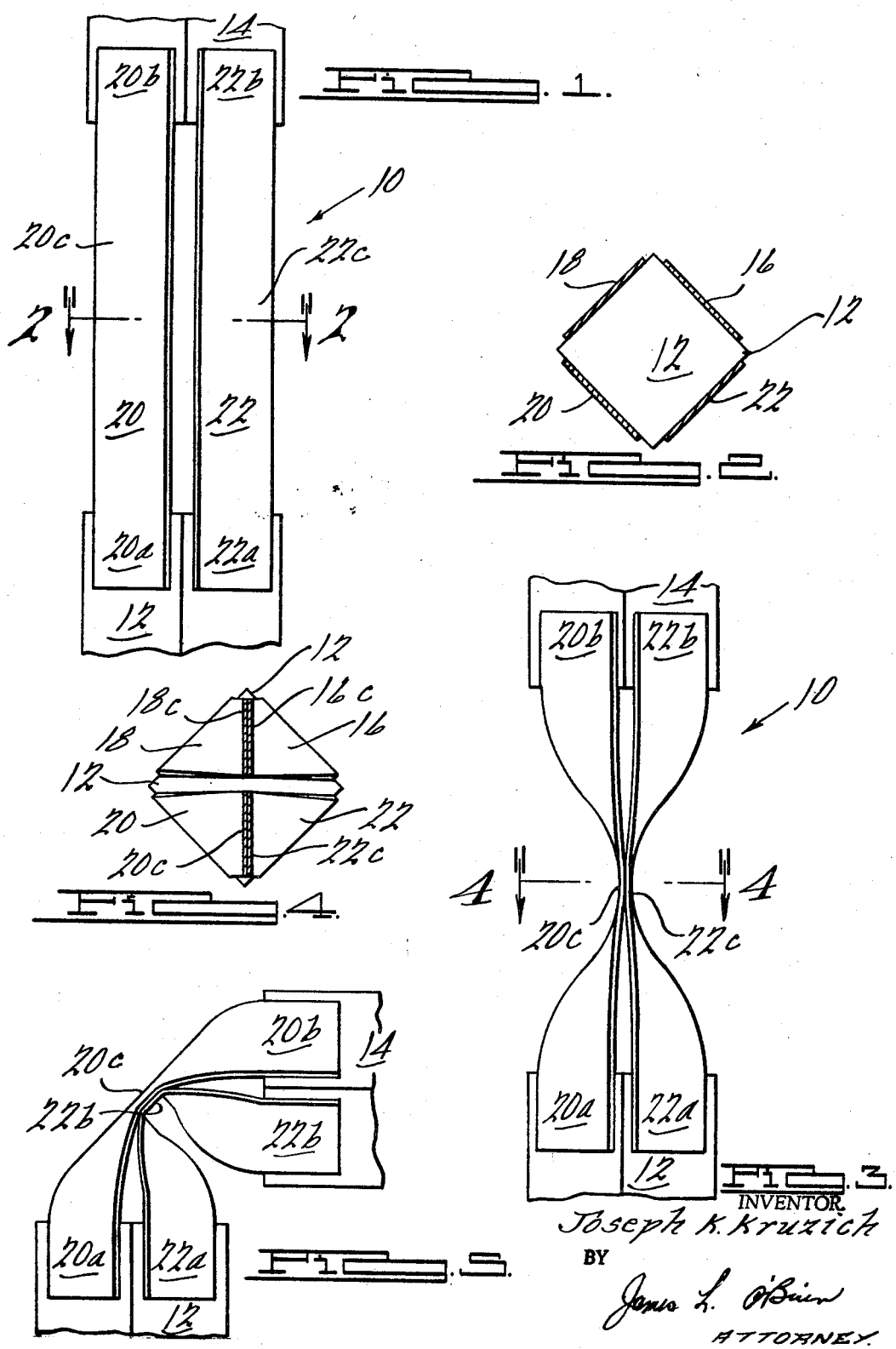

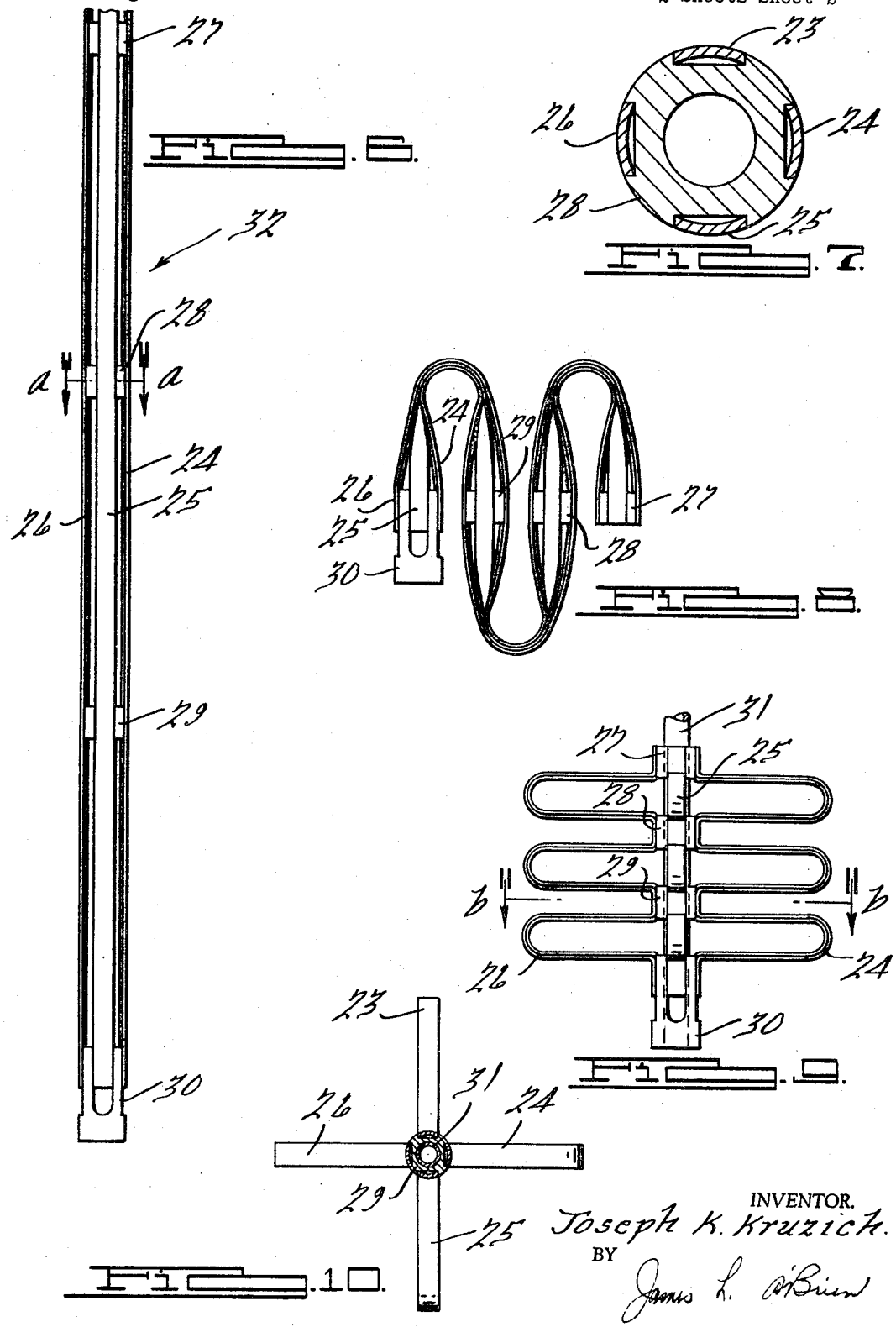

3,474,488
FOLDABLE AND COMPRESSIBLE SELF-ERECTING DEVICES
Joseph K. Kruzich, Ann Arbor, Mich., assignor to The Bendix Corporation, a corporation of Delaware
Filed Aug. 24, 1967, Ser. No. 663,163
Int. Cl. E05f 1/12; E04h 12/18; F16f 3/08
U.S. Cl. 16—180         8 Claims

ABSTRACT OF THE DISCLOSURE (1) A foldable self-erecting hinge comprising a plurality of resilient members connecting a first member and a second member whereby the resilient members may be twisted so as to occupy one plane and thereafter bent about an axis within said plane, thereby folding said first member adjacent to said second member.

(2) A compressible self-erecting device comprising a plurality of resilient members connecting a first member and a second member whereby said device may be compressed by bowing the resilient members outwardly.

BACKGROUND OF THE INVENTION

Field of the invention

The present invention relates generally to foldable self-erecting hinges and compressible self-erecting devices which are particularly useful in connecting antennae, booms and the like to satellites and spacecraft.

Description of the prior art

The success of most space missions depends upon an interchange of information between the space vehicle and ground stations. This information is generally transmitted from and received by the spacecraft through external antennae. Normally, antennae are folded into the interior of the spacecraft before launch and are erected after the spacecraft has entered a space environment. Folding devices generally comprise a hinge at which point the fold is made. Most hinges presently known use a pin or the like upon which at least one other member rotates. As will be appreciated by one skilled in the art, these pins and members are subject to seizing in the high vacuum of space. In addition to a hinge, both a source of external power to move the antenna from the folded position to the erect position and a locking means to prevent collapse of the antenna must be provided. As will also be appreciated by one skilled in the art, these ancillary devices undesirably increase the weight and dimensions of the antenna system.

SUMMARY OF THE INVENTION

The present invention permits an antenna or the like to be folded or compressed so as to occupy minimum space, erected without external power, and held in the erect position without an additional locking device. This has been accomplished by providing a device which may be restrained in a folded or compressed form wherein it possesses sufficient potential energy to cause it to assume a rigid, erect position when the restraint is removed. Furthermore, a device has been provided which functions without having members in sliding contact. More particularly, a plurality of resilient straps are used to connect the antenna or the like to the spacecraft or any other mounting in such a fashion that they may be twisted so as to be substantially parallel and thereafter folded into a collapsed configuration. The device can also be compressed into a collapsed configuration by first bowing the resilient straps outwardly.

BRIEF DESCRIPTION OF THE DRAWINGS

FIGURE 1 is a plan view of a first embodiment of the present invention;
FIGURE 2 is a view taken along the lines 2—2 of FIGURE 1;
FIGURE 3 is a view showing operating position of the parts of the device shown in FIGURE 1;
FIGURE 4 is a view taken along lines 4—4 of FIGURE 3;
FIGURE 5 is a view showing another operating position of the device shown in FIGURE 1;
FIGURE 6 is a view showing a second embodiment of the present invention comprising a plurality of hinges similar to that shown in FIGURE 1;
FIGURE 7 is a view taken along lines a—a of FIGURE 6;
FIGURE 8 is a view showing the operating position of the device shown in FIGURE 6;
FIGURE 9 is a view showing another operating position of the device shown in FIGURE 6; and
FIGURE 10 is a view taken along the lines b—b of FIGURE 9.

DESCRIPTION OF THE PREFERRED EMBODIMENTS

Referring now to FIGURES 1 through 5 of the drawings, numeral 10 designates a foldable self-erecting device for connecting one member 12, which may be a part of a satellite, spacecraft or the like, to another member 14, which may be an antenna, boom or the like. The device 10 comprising four quadrilaterally disposed resilient straps 16, 18, 20 and 22, having substantially parallel lengthwise axes and each having an elongated cross-section in a plane normal to its lengthwise axis, which cross-section may be rectangular or arcuate. Each strap has one end portion 16a, 18a, 20a, and 22a secured to the member 12 in angular relationship with adjacent straps and an opposite portion end 16b, 18b, 20b and 22b secured to the member 14 in substantially the same angular relationship. The end portions must be separated a distance equal to at least two strap widths to allow proper operation of the device. The straps are made from an elastic or resilient material such as spring steel and have an intermediate portion 16c, 18c, 20c and 22c, which may be rotated from a rigid erect configuration wherein adjacent straps are in substantially right angle relationship, as shown in FIGURES 1 and 2, to an intermediate configuration wherein adjacent pairs of straps are parallel, as illustrated in FIGURES 3 and 4. When in the intermediate configuration, the device's resistance to lateral force is substantially reduced thereby allowing it to be folded into the collapsed configuration shown in FIGURE 5. In the folded position of FIGURE 5, the device possesses stored energy such that upon removal of the applied lateral force or other resistance the device will return to the erect position shown in FIGURE 1.

Referring now to FIGURES 6 through 10 of the drawings, numeral 32 refers to a foldable or compressible self-erecting device comprising four resilient straps 23, 24, 25 and 26, each having an arcuate cross-section to improve resistance to bending, connected by members 27, 28, 29 and 30. The resilient straps may be constructed of electrically conducting materials and the connecting members may be constructed of dielectric materials to form a plurality of electrically-isolated conductors which are useful in many antennae installations. The straps have a plurality of intermediate portions which can be folded in the manner described in FIGURES 1 through 5 thereby forming a plurality of hinges as shown in FIGURE 8, which are self-returnable to the erect position as shown in FIGURE 6. Torque will be produced upon the release of each hinge. It is preferable in some spacecraft installations to use a two-hinge device so that the release of a second hinge will counterbalance the torque produced by the release of the first hinge.

In FIGURES 9 and 10, another mode of operation of the device 32 is illustrated in which a thrust rather than a torque is produced upon release of the device. In that mode, the intermediate portions are first bowed outward so as to assume an intermediate configuration wherein the device's resistance to compression is substantially reduced. Thereafter, the device may be readily compressed upon application of an axial force into a collapsed configuration wherein the intermediate portions are bent through an arc of approximately 180° as shown in FIGURES 9 and 10. A guide post 31 is provided for convenient storage of device 32 in its collapsed configuration. In the compressed form, the device 32 contains stored energy which allows erection without external assistance upon its release. In its extended form as shown in FIGURE 6, the device 32 resists bending and constitutes a satisfactory antenna or boom for a satellite, spacecraft or other vehicle.

The embodiments of the present invention are extremely simple in construction and operation, are light weight, have a good section modulus in the erect position, require no external power for erection and have no sliding surfaces to bind in an adverse environment.

Although the present invention has been described with reference to specific embodiments, it will be readily apparent to one skilled in the art that various changes and modifications may be made without departing from the spirit of the invention.

Having thus described my invention, I claim:

1. A self-erecting device for connecting a first member to a second member comprising: a plurality of resilient straps having substantially parallel lengthwise axes and each having an elongated cross-section in a plane normal to said lengthwise axis, said straps having a first end adapted to be rigidly connected to said first member with at least two of said straps in angular relationship, and a second opposite end adapted to be rigidly connected to said second member with said two straps in angular relationship, said ends being separated a distance equal to at least two strap widths, each of said straps having an intermediate portion between said first and second ends, said device being in a rigid erect position with said first end and said second end at maximum displacement when said intermediate portions are substantially straight, said intermediate portions being adapted to be flexed so as to assume an intermediate configuration wherein resistance to relative movement between said first and second ends is substantially reduced, said intermediate portions being bendable through a substantial arc so as to assume a collapsed configuration wherein the displacement between said first and second ends is substantially reduced, said device being self-returnable from said collapsed configuration to said erect configuration.

2. The device of claim 1 having four quadrilaterally disposed straps.

3. The device of claim 1 wherein said intermediate portions are adapted to be rotated to substantially parallel relationship and are foldable upon application of lateral force when in said parallel relationship.

4. The device of claim 1 wherein said intermediate portions are adapted to be bowed outwardly such that said device is compressible upon application of an axial force.

5. The device of claim 1 wherein each of said straps has a plurality of said intermediate portions.

6. The device of claim 1 wherein adjacent straps are in angular relationship.

7. The device of claim 1 wherein opposite ends of said two straps are in substantially the same angular relationship.

8. The device of claim 1 wherein said intermediate portions are bendable through an arc of approximately 180°.

References Cited

UNITED STATES PATENTS

| | | | |
|---|---|---|---|
| 2,591,769 | 4/1952 | Beechler | 267—1 |
| 3,386,128 | 6/1968 | Vyvyan | 16—150 |

BOBBY R. GAY, Primary Examiner

D. L. TROUTMAN, Assistant Examiner

U.S. Cl. X.R.

52—108; 267—1